March 25, 1969 B. VAN DER VOO 3,435,155

POLE PIECES FOR MAGNETIC HEADS WITH ACCURATELY DETERMINED GAP HEIGHTS

Original Filed March 2, 1964

INVENTOR.
BASTIAAN VAN DER VOO
BY
Frank R. Trifari
AGENT

United States Patent Office 3,435,155

Patented Mar. 25, 1969

3,435,155
POLE PIECES FOR MAGNETIC HEADS WITH ACCURATELY DETERMINED GAP HEIGHTS

Bastiaan Van Der Voo, Emmasingel, Eindhoven, Netherlands, assignor to North American Philips Company, Inc., New York, N.Y., a corporation of Delaware Continuation of application Ser. No. 348,335, Mar. 2, 1964. This application May 17, 1967, Ser. No. 639,249
Claims priority, application Netherlands, Mar. 1, 1963, 289,675
Int. Cl. G11b 5/22
U.S. Cl. 179—100.2 1 Claim

ABSTRACT OF THE DISCLOSURE

A two piece magnetic head wherein one pole piece is provided with an auxiliary face. The additional face provides an accurate reference line for grinding the head surface to a desired height in that the straight edged boundary of the additional face replaces the relatively inaccurate gap face edge which is the result of the grinding and polishing step.

This application is a continuation of application Ser. No. 348,335, filed Mar. 2, 1964 now abandoned, by Bastiaan Van Der Voo.

This invention relates to a method of manufacturing a pole piece for a magnetic head intended for recording, reproducing and/or erasing magnetic recordings; more particularly, the invention relates to a method of manufacturing such as pole piece for a head having a gap height which must lie within very narrow limits.

The invention is specifically adaptable for pole pieces made of sintered oxidic ferromagnetic material or ferrite. In manufacturing such a pole piece it is the usual practice to grind and to polish to a high degree a surface of the pole piece which becomes a boundary face of the useful gap after assembly in the completed head. It has been found in practice that difficulties arise in determining the correct gap height after the complete head is assembled. The lower boundary line of the polished face located on the inner side of the pole piece must be used as a reference line after assembling for correct determination of the gap height; the correct gap height, which is often, for example, only 100 microns with a minimum tolerance, is then determined by grinding away the front face, i.e., the face adjacent the record carrier. However, this lower boundary line, which is adjusted microscopically, is found to be no longer accurately perceptible after the polishing operation.

According to the invention, after the polishing operation, the intersecting line between the polished boundary face and the inner face of the pole piece is ground away so as to obtain an additional face which is at an obtuse angle to the boundary face of the gap. It has been found that the separating line between this additional face and the gap boundary face is completely sharp so that this line can now be used as a reference line for the accurate determination of gap height.

The invention also relates to a pole piece manufactured by the method above described.

In order that the invention may be readily carried into effect, it will now be described more fully, by way of example, with reference to the accompanying diagrammatic drawing, in which.

Figure 1:
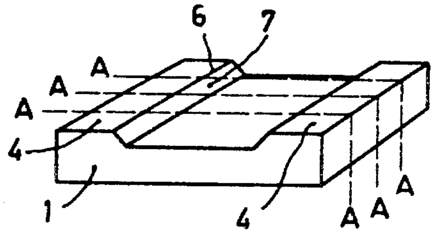
FIGURE 1 shows a U-shaped body of sintered oxidic ferromagnetic material (ferrite)
Figure 2:
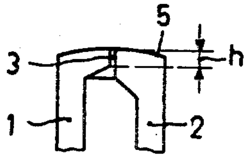
FIGURE 2 is a side view of part of a magnetic head.
Figure 3:
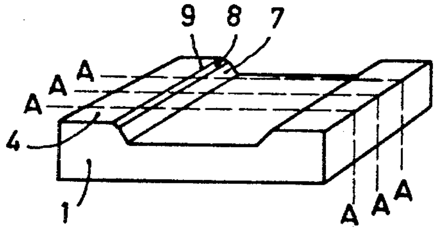
FIGURE 3 shows a U-shaped body of ferrite manufactured in accordance with the invention.

Referring now to FIGURE 1, the reference numeral 1 denotes a U-shaped body of sintered oxidic ferromagnetic material which is wholly ground and from which, after completion, pole pieces for magnetic heads may be manufactured by sawing the body along the broken lines A—A. As shown in FIGURE 2, the parts thus obtained are secured to other similar parts 2 with the interposition of a non-magnetizable material 3 which bond the parts together, preferably glass. The faces 4 are high-gloss polished prior to the securing procedure and their flatness must be such that no deviation can be found upon measurement with a purely planoparallel glass plate. After assembly, the height of the gap must be accurately adjusted by grinding off the front face 5 and this adjustment is possible only by microscopic measurement of the height *h*. However, it has been found that, after polishing the faces 4, the intersecting line 6 between the faces 4 and 7 can no longer be used for accurate measurement since this line has acquired an irregular form due to the polishing of the face 4. If, however, according to the invention, the line 6 is ground away, as shown in FIGURE 3, so as to obtain a face 8 which is at an obtuse angle to the gap boundary face 4, the intersecting line 9 between the faces 8 and 4 is found to be completely sharp again when observed under a microscope. The line 9 may consequently serve as an accurate reference line for adjusting the height *a* of the gap. In a practical embodiment, it was found to be sufficient for the face 8 to be no wider than 0.5 mm. In this case, the surface 4 was so polished that it was optically flat.

While the invention has been described with respect to a specific embodiment, modifications thereof will be readily apparent to those skilled in the art without departing from the inventive concept, the scope of which is set forth in the appended claim.

I claim:

1. A pole piece for a ferrite magnetic head, comprising: a piece of magnetic ferrite having a leg portion angularly adjoining a body portion, said leg portion having a first surface forming the top running surface of the head and a second surface adapted to be placed adjacent to a second piece of magnetic ferrite with the interposition of a non-magnetic gap-filling material to form a gap, said first and second surface being orthogonal, said second surface being polished to a high degree of flatness, and a third surface for determining the height of the ultimately desired gap forming a first line of intersection with said second surface and a second line of intersection with a fourth surface on said leg portion, said third surface extending at an angle exceeding 180 degrees between both the second and fourth surfaces respectively, said fourth surface forming an obtuse angle with said body portion.

References Cited

UNITED STATES PATENTS

| | | | |
|---|---|---|---|
| 3,287,504 | 11/1966 | Morley | 340—174.1 |
| 3,233,308 | 2/1966 | Duinker et al. | 29—603 |
| 3,177,475 | 4/1965 | Bos et al. | 340—174.1 |
| 3,108,281 | 10/1963 | Uemura et al. | 346—74 |
| 3,094,772 | 6/1963 | Duinker | 179—100.2 |
| 3,047,674 | 7/1962 | Keskinen | 179—100.2 |
| 2,943,384 | 7/1960 | Wisner | 179—100.2 |
| 3,431,541 | 11/1947 | Camras | 179—100.2 |

BERNARD KONICK, *Primary Examiner.*

VINCENT P. CANNEY, *Assistant Examiner.*

U.S. Cl. X.R.

29—603; 340—174.1

REEXAMINATION CERTIFICATE (519th)

United States Patent [19] | [11] B1 3,435,155

Van Der Voo | [45] Certificate Issued Jun. 24, 1986

[54] POLE PIECES FOR MAGNETIC HEADS WITH ACCURATELY DETERMINED GAP HEIGHTS

[75] Inventor: Bastiaan Van Der Voo, Eindhoven, Netherlands

[73] Assignee: North American Philips Company, Inc., New York, N.Y.

Reexamination Request:
No. 90/000,746, Mar. 25, 1985

Reexamination Certificate for:
Patent No.: 3,435,155
Issued: Mar. 25, 1969
Appl. No.: 639,249
Filed: May 17, 1967

Related U.S. Application Data

[63] Continuation of Ser. No. 348,335, Mar. 2, 1964, abandoned.

[30] Foreign Application Priority Data

Mar. 1, 1963 [NL] Netherlands .......................... 289675

[51] Int. Cl.[4] ........................ G11B 5/23; G11B 5/127; H01F 7/06

[52] U.S. Cl. .................................. 360/119; 360/125; 29/603

[58] Field of Search ............................... 360/119, 125

[56] References Cited

U.S. PATENT DOCUMENTS

| | | | |
|---|---|---|---|
| 2,919,312 | 12/1959 | Rosenberger et al. | 179/100.2 |
| 3,094,772 | 6/1963 | Duinker | 29/603 |
| 3,354,540 | 11/1967 | Duinker | 29/603 |
| 3,531,859 | 10/1970 | Van Der Voo | 29/603 |

FOREIGN PATENT DOCUMENTS

| | | |
|---|---|---|
| 616059 | 10/1962 | Belgium . |
| 1094995 | 7/1962 | Fed. Rep. of Germany . |

OTHER PUBLICATIONS

"Durable High-Resolution Ferrite Transducer Heads Employing Bonding Glass Spacers" S. Duinker, 15 Philips Res. Repts. 342-367 (1960).

*Primary Examiner*—Vincent P. Canney

[57] ABSTRACT

A two piece magnetic head wherein one pole piece is provided with an auxiliary face. The additional face provides an accurate reference line for grinding the head surface to a desired height in that the straight edged boundary of the additional face replaces the relatively inaccurate gap face edge which is the result of the grinding and polishing step.

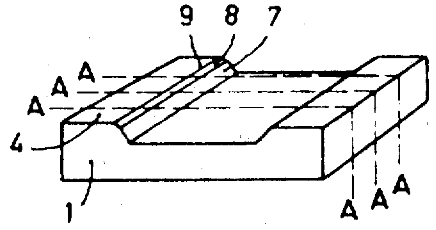

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *